United States Patent
Maurio et al.

[11] Patent Number: 6,020,665
[45] Date of Patent: *Feb. 1, 2000

[54] PERMANENT MAGNET SYNCHRONOUS MACHINE WITH INTEGRATED MAGNETIC BEARINGS

[75] Inventors: Joseph Michael Maurio, Waterford, Conn.; Edgar S. Thaxton, Bradford, R.I.

[73] Assignee: Electric Boat Corporation, Groton, Conn.

[*] Notice: This patent issued on a continued prosecution application filed under 37 CFR 1.53(d), and is subject to the twenty year patent term provisions of 35 U.S.C. 154(a)(2).

[21] Appl. No.: 09/030,757

[22] Filed: Feb. 25, 1998

[51] Int. Cl.[7] .................................................. H02K 7/09
[52] U.S. Cl. ........................................... 310/90.5; 318/721
[58] Field of Search .................................. 310/90.5, 179; 318/721, 722, 652

[56] References Cited

U.S. PATENT DOCUMENTS

| | | | |
|---|---|---|---|
| 3,224,818 | 12/1965 | Sixsmith | 310/90.5 |
| 3,638,093 | 1/1972 | Ross | 318/687 |
| 3,697,143 | 10/1972 | Klinchuch | 310/90.5 D |
| 3,769,555 | 10/1973 | Dolbachian et al. | 318/138 |
| 3,845,995 | 11/1974 | Wehde | 310/90.5 |
| 3,955,426 | 5/1976 | Klinchuch | 74/5.6 |
| 4,329,636 | 5/1982 | Uchida et al. | 318/721 |
| 4,389,849 | 6/1983 | Gasser et al. | 62/6 |
| 4,470,644 | 9/1984 | Weisser | 310/90.5 |
| 4,483,570 | 11/1984 | Inoue | 310/90.5 |
| 4,792,710 | 12/1988 | Williamson | 310/90.5 |
| 4,814,677 | 3/1989 | Plunkett | 318/254 |
| 4,841,204 | 6/1989 | Studer | 318/254 |
| 4,983,915 | 1/1991 | Rossi | 324/207.17 |
| 4,999,534 | 3/1991 | Andrianos | 310/90.5 |
| 5,053,662 | 10/1991 | Richter | 310/90.5 |
| 5,202,824 | 4/1993 | Chen | 36/528.14 |
| 5,235,454 | 8/1993 | Iwasaki | 310/90.5 |
| 5,237,229 | 8/1993 | Ohishi | 310/90.5 |
| 5,300,843 | 4/1994 | Lyons et al. | 310/90.5 |
| 5,329,217 | 7/1994 | Kerman et al. | 318/811 |
| 5,376,871 | 12/1994 | Takara et al. | 318/610 |
| 5,424,595 | 6/1995 | Preston et al. | 310/90.5 |
| 5,449,986 | 9/1995 | Dozor | 318/254 |
| 5,578,880 | 11/1996 | Lyons et al. | 310/90.5 |
| 5,880,550 | 3/1999 | Fukao et al. | 310/179 |
| 5,936,370 | 8/1999 | Fukao et al. | 318/652 |

*Primary Examiner*—Nestor Ramirez
*Assistant Examiner*—Joseph Waks
*Attorney, Agent, or Firm*—Baker & Botts, L.L.P.

[57] ABSTRACT

In the particular embodiments described in the specification, a permanent magnet synchronous machine includes a stator with a plurality of stator coils and a rotor within the stator having a plurality of permanent magnets disposed around its periphery, and position detectors for detecting the horizontal, vertical and axial positions of the rotor within the stator. A magnetic bearing control arrangement generates control signals based on deviations of the rotor position from a desired position and supplies corrective signals to the stator coils and a motor control arrangement detects the angular position and speed of the rotor within the stator and supplies signals to the stator coils simultaneously with the magnetic bearing control signals to control the angular position and rotational speed of the rotor.

5 Claims, 3 Drawing Sheets

PERMANENT MAGNET SYNCHRONOUS MACHINE WITH INTEGRATED MAGNETIC BEARINGS

BACKGROUND OF THE INVENTION

This invention relates to permanent magnet synchronous machines, such as motors and generators, having integrated magnetic bearings.

Conventional magnetic bearing systems for motors or generators typically require two magnetic bearings, each of which is mounted on the same shaft. To prevent rotor tilt some synchronous machines utilized two separate windings in the same machine housing, in addition to the magnetic elements required for the motor or generator, to produce radial magnetic action and torque production respectively. However, such systems often require a mechanical thrust bearing or an additional magnetic bearing.

The Preston et al. Pat. No. 5,424,595 discloses an integrated magnetic bearing and switched reluctance rotary electric machine in which separately excitable stator phase windings receive a combination of signals, one of which is a phase winding signal and the other of which is a magnetic bearing signal. The two signals are superimposed on the windings in such a manner as to drive the motor and produce the magnetic force necessary to support the rotor in the absence of a mechanical bearing.

The Ohishi Pat. No. 5,237,229 discloses a magnetic bearing device utilizing a rotating magnetic field. That device includes a rotor which has a number of permanent magnets and is mounted on a central shaft which is connected to the drive shaft for a rotating load of an external device. The stator contains electromagnets which are energized successively so as to produce a rotating magnetic field consisting of polarities arranged to oppose or attract the polarities of the permanent magnets mounted on the rotor so as to support the rotor shaft centrally in the device. The Lyons U.S. Pat. No. 5,578,880 also discloses an active magnetic bearing system in which electromagnet coils in a stator surrounding a rotor are controlled by independent controllers to produce a magnetic bearing supporting the rotor and U.S. Pat. No. 5,202,824 to Chen discloses a proportional integral differentiation arrangement for controlling a magnetic bearing system.

SUMMARY OF THE INVENTION

Accordingly, it is an object of the present invention to provide a permanent magnet synchronous machine with integrated magnetic bearings which overcomes disadvantages of the prior art.

Another object of the invention is to provide a permanent magnet synchronous machine which requires at most one magnetic bearing and therefore occupies less space than a conventional motor or generator with a magnetic bearing system, permitting a higher level of integration as well as more efficient use of magnetic volume.

These and other objects of the invention are attained by providing a permanent magnet synchronous machine with stator windings which provide both radial and thrust magnetic bearing forces and which also apply rotating force to the rotor, thereby eliminating the need to construct separate and specialized permanent magnet motors and magnetic bearings. For this purpose, coil groups in the stator windings are supplied with current waveforms having a relationship to the polarities of the permanent magnets in the rotor so as to produce a magnetic bearing supporting the rotor as well as a drive torque for turning the rotor. The current waveforms necessary for the magnetic bearing action and for the motor action are summed electrically in a controller and injected into the windings, thereby producing the same effect as a machine having separate magnetic bearing windings and motor windings but in a more efficient manner. Signals corresponding to rotor positions in the horizontal and vertical planes are compared with desired positions. A detector detects the axial position of the rotor within the stator and generates control signals for application to the stator coils to maintain the rotor in a desired actual position within the stator.

In one embodiment a four-pole machine has 4-pole stator windings which are split in half to permit emulation of both 2-pole magnetic bearing windings and 4-pole machine windings. Each phase of the 4-pole windings consists of two coil groups diametrically opposite to each other as in a consequent-pole winding machine and the two coil groups are not connected to each other electrically. Such electrical separation of the windings allows generation of either four or two magnetic pole faces per phase depending on the direction of current flow into each winding.

The machine drive action and the magnetic bearing action may be considered separately since the electromagnetic system of the motor may be treated as linear. For the present discussion the 4-pole, three phase windings are transformed into two phase windings fixed in the stationery reference frame.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
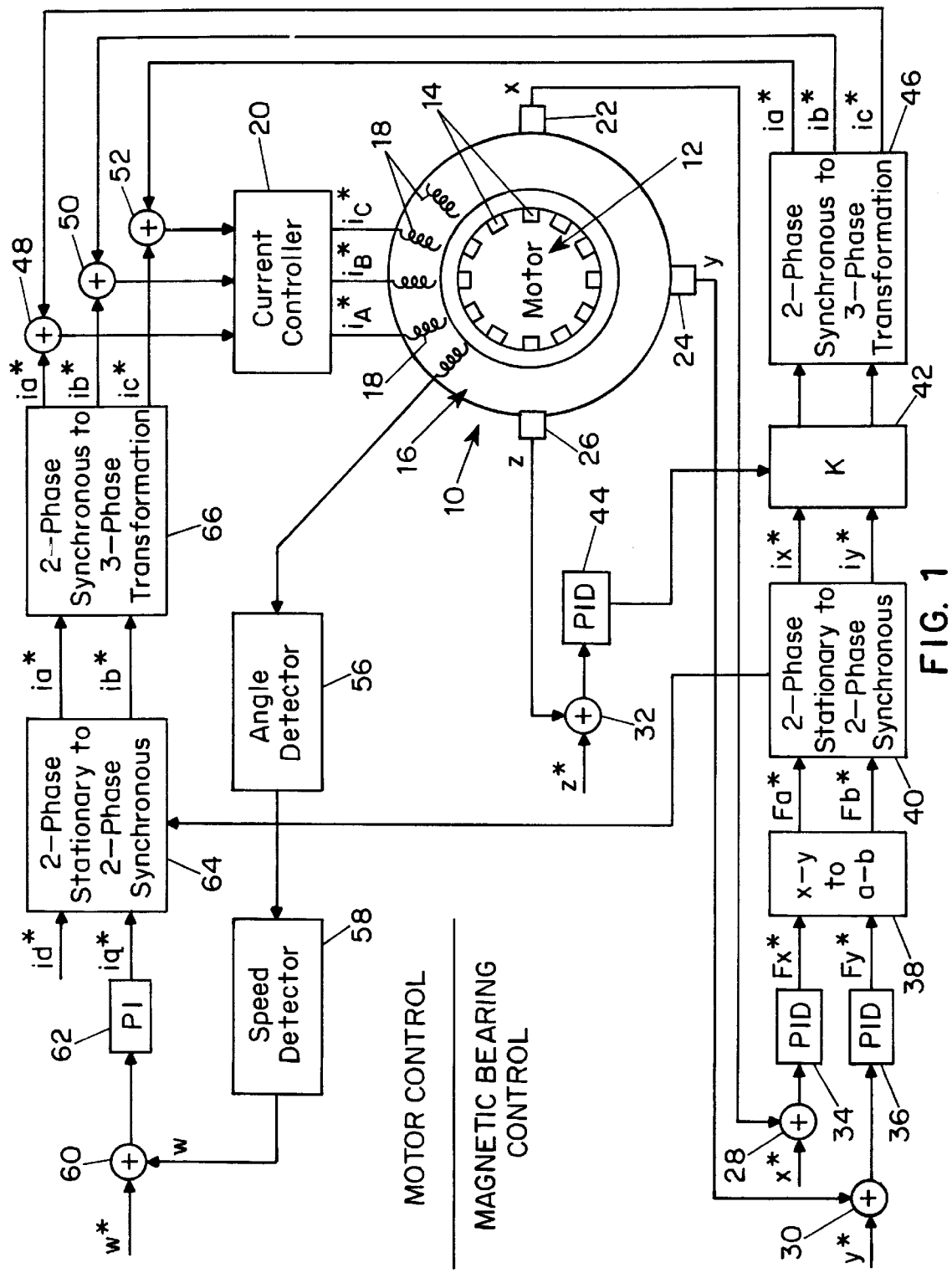
FIG. 1 is a schematic block diagram showing the system configuration for a permanent magnet synchronous machine with integrated magnetic bearings in accordance with a representative embodiment of the invention.

In the typical embodiment of the invention schematically illustrated in FIG. 1, an electromechanical machine such as a motor 10 includes a rotor 12 having a series of angularly spaced permanent magnets 14 fixed in its periphery and a stator 16 surrounding the rotor and containing coils 18 arranged for interaction with the magnets 14 in the rotor 12. Current is applied to the stator coils 18 from a current controller 20 in such a way that the stator coils 18 interact with the permanent magnets 14 not only to induce rotation of the rotor 12 in the conventional way but also to provide a magnetic bearings supporting the rotor 12 centrally within the stator 16 in the manner of a magnetic bearing.

Two sensors 22 and 24 detect displacement of the rotor 12 in the horizontal and vertical directions x and y, respectively, and a sensor 26 detects displacement of the rotor 12 in the axial direction. These detectors supply corresponding signals to three comparators 28, 30 and 32, respectively in which they are compared with desired horizontal vertical and axial positions x*, y* and z* respectively of the rotor 12. The difference signals generated in the horizontal and vertical position comparators 28 and 30 are supplied to corresponding proportional integral differentiators 34 and 36 which, in turn, produce horizontal and vertical force commands Fx* and Fy* and supply them to a transform unit 38 which transforms those signals to ab force commands Fa* and Fb* corresponding to axes of the rotor as described hereinafter. The force commands Fa* and Fb* are in turn supplied to a converter 40 which converts two phase stationary signals to two phase synchronous signals to produce corresponding horizontal and vertical coil current commands ix* and iy* which are transmitted to a scaling unit 42. The scaling unit 42 also receives a signal from a proportional integral differentiator 44 based on the axial difference signal produced by the comparator 32 and generates a corresponding scaling factor K which modulates the current commands ix* and iy* so as to vary uniformly in the axial direction the intensity of the magnetic field produced by the radial magnetic bearing, resulting in a restoring force for the rotor along the Z axis. The resulting modified 2-phase signals are then transformed into three phase signals ia*, ib* and ic* in a transformation unit 46 which are transmitted to corresponding summing units 48, 50 and 52 to provide the magnetic bearing control components of the composite signals $i_A^*$, $i_B^*$ and $i_C^*$ supplied from the summing units to the current controller 20.

In order to control the rotation of the rotor 12, signals produced by the rotary motion of the rotor 12 are transmitted to an angle detector 56 and a speed detector 58 which determine respectively the angular positions of the north and south poles of the magnets 14 with respect to the stator coils 18 and the speed of rotation of the rotor based on the motion of the magnets 14. These signals are compared in a comparator 60 with a signal w* representing the desired speed of the rotor, producing a control signal which is supplied to a proportional integral motor speed controller 62 that generates a quadrature axis current command iq* in the rotor coordinate reference frame. The iq* command and an id* current command are supplied to a convertor 64. The converter 64 transforms those two signals from the two phase stationary reference frame to the two phase synchronous reference frame of the stator coordinates ia* ib* and those signals are in turn transformed in a converter 66 to the three phase stationary reference frame signals ia*, ib*, and ic* for control of the rotation of the motor. These signals are then combined in three summing units 48, 50 and 52 with the corresponding magnetic bearing control signals ia*, ib*, and ic* from the converter 66 and to provide combined motor current command signals $i_A^* i_B^*$, $i_c$ for the current controller 20.

Figure 2:
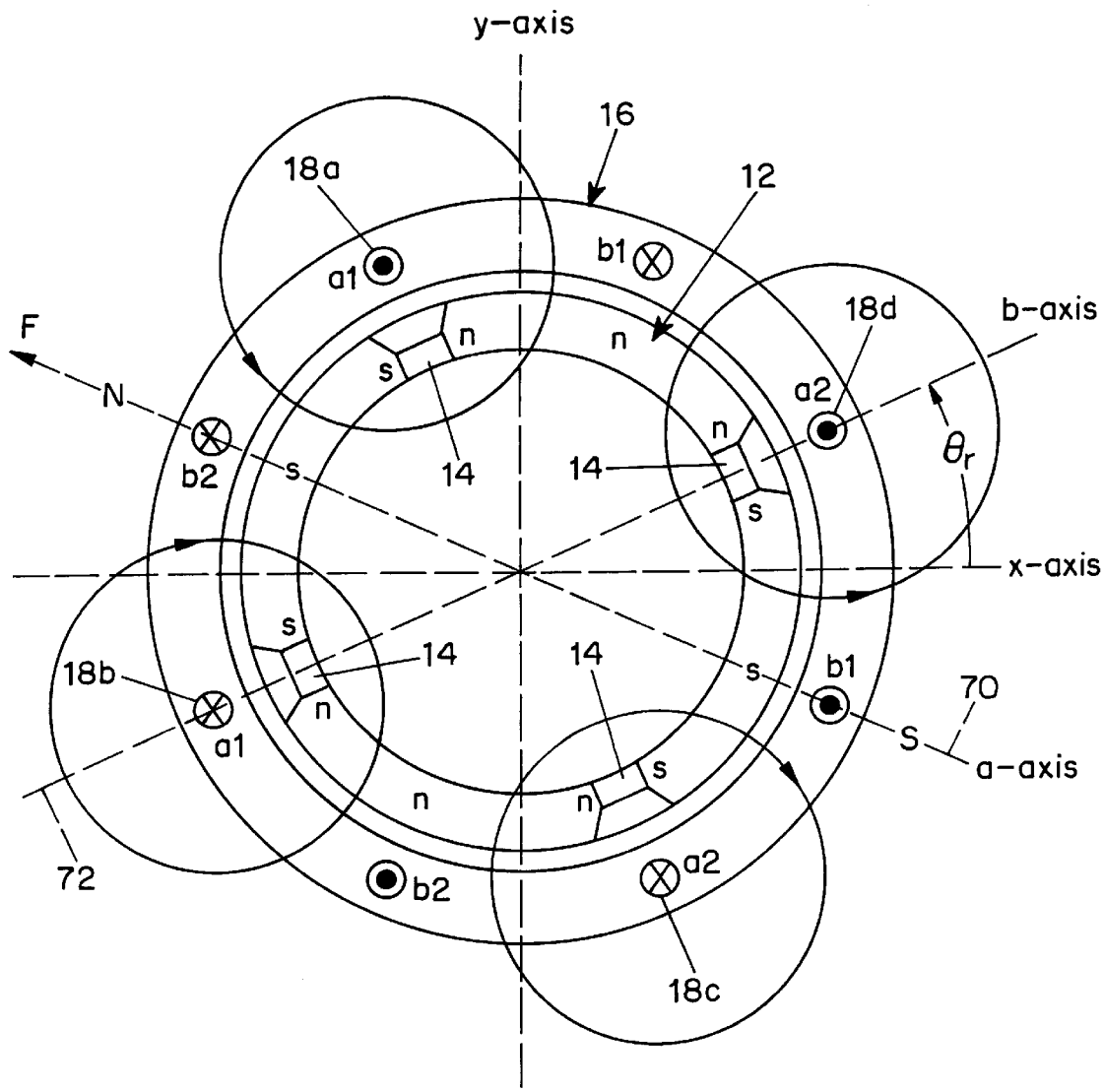
FIG. 2 is a schematic diagram representing a cross-section through a representative embodiment of a permanent magnet synchronous machine with integrated magnetic bearings illustrating the magnetic bearing action produced in the stator coils.

FIG. 2 illustrates the manner in which the magnetic bearing control signal ia*, ib* and ic*, when applied to the stator windings produce the magnetic bearing to support the rotor. In FIG. 2 the rotor 12 is shown as having four permanent magnets 14 presenting opposed north and south poles toward each other in the circumferential direction defining an a-axis 70 extending diametrically through regions spaced equally from adjacent magnets and a b-axis 72 extending diametrically through two opposed magnets in the rotor 12. In this illustration each stator coil 18 is represented by a solid dot or an X depending upon the direction in which current is applied to the coil as shown by the arrows in the circles surrounding the coil representations. In the instance shown in FIG. 2, two coils 18*a* and 18*d* are energized to produce a counter-clockwise flux pattern and two other coils 18*b* and 18*c* are energized to produce a clockwise flux pattern, resulting in a magnetic field which has a north pole which is above the horizontal axis as seen in FIG. 2 by an angle θr and located between south poles of the rotor magnets and a south pole which is below the horizontal axis by a corresponding angle and located between south poles of the rotor, thereby producing a force urging the rotor upwardly along the axis in the direction of the arrow F. The magnitude and direction of the force F depends on the signals x*y*z* corresponding to the displacement from the rotor from the desired position.

In order to determine the forces produced by the stator windings, it is useful to obtain the flux linkage expressions for the machine. The flux linkage equations in two phase coordinates in the machine may be expressed as:

$$\begin{bmatrix} \lambda_{a1} \\ \lambda_{a2} \\ \lambda_{b1} \\ \lambda_{b2} \end{bmatrix} = \begin{bmatrix} L_{a1a1} & L_{a1a2} & 0 & 0 \\ L_{a2a1} & L_{a2a2} & 0 & 0 \\ 0 & 0 & L_{b1b1} & L_{b1b2} \\ 0 & 0 & L_{b2b1} & L_{b2b2} \end{bmatrix} \begin{bmatrix} i_{a1} \\ i_{a2} \\ i_{b1} \\ i_{b2} \end{bmatrix} + \lambda_{pm} \begin{bmatrix} \cos(\theta_r - \pi/8) \\ -\cos(\theta_r - \pi/8) \\ \cos(\theta_r + \pi/8) \\ -\cos(\theta_r + \pi/8) \end{bmatrix}$$

or, in matrix notation:

$$\lambda_{ab} = L i_{ab} + \lambda_{pm}$$

where $\lambda_{a1}, \lambda_{a2}, \lambda_{b1} \lambda_{b2}$ are the flux linkages of the a1, a2, b1, and b2 windings, Lxy represent the self and mutual inductances of the motor windings, $\lambda_{pm}$ is the amplitude of the flux linkages established by the permanent magnets as viewed from the stator phase windings and $\theta_r$ is the angle of the rotor.

The magnetic energy of the windings and the permanent magnets can be written as $W_m = i_{ab} L i^T_{ab} + i_{ab} \lambda_{pm} + W_{pm}$, where $W_{pm}$ relates to the energy associated with the permanent magnet. Expansion and simplification yields:

$$W_m = \frac{1}{2}[(i_{a1}^2 L_{a1a1} + i_{a2} i_{a1} L_{a2a1}) + (i_{a1} i_{a2} L_{a1a2} + i_{a2}^2 L_{a2a2}) +$$
$$(i_{b1}^2 L_{b1b1} + i_{b2} i_{b1} L_{b2b1}) + (i_{b1} i_{b2} L_{b1b2} + i_{b2}^2 L_{b2b2})] +$$
$$i_{a1} \lambda_m \cos\left(\theta_r - \frac{\pi}{8}\right) - i_{a2} \lambda_m \cos\left(\theta_r - \frac{\pi}{8}\right) +$$
$$i_{b1} \lambda_m \cos\left(\theta_r + \frac{\pi}{8}\right) - i_{b2} \lambda_m \cos\left(\theta_r + \frac{\pi}{8}\right)$$

The self-inductances $L_{a1a1}, L_{a1a2}, L_{a2a1}, L_{a2a2}, L_{b1b1}, L_{b1b2}, L_{b2b1}$ and $L_{b2b2}$ are a function of the air gap distance and will vary in the a-axis and b-axis directions as well as the thrust axis as the rotor assembly moves out of position. This is due to the increased reluctance seen by the flux generated by an individual coil as the air gap distance (both radial and axial) varies. This relationship can be determined either analytically or experimentally.

Radial forces in the a-axis and b-axis directions can be determined by taking the partial derivatives of the magnetic energy in the direction of interest:

$$\begin{bmatrix} F_{a\text{-}axis} \\ F_{b\text{-}axis} \end{bmatrix} = \begin{bmatrix} \dfrac{\partial W_m}{\partial(a\text{-}axis)} \\ \dfrac{\partial W_m}{\partial(a\text{-}axis)} \end{bmatrix}$$

To determine the forces that can be generated in the x and y directions, it is necessary to transform the a-axis and b-axis forces to forces along the x and y axes:

$$\begin{bmatrix} F_x \\ F_y \end{bmatrix} = \begin{bmatrix} \cos(\pi/8) & \cos(\pi/8) \\ \sin(\pi/8) & \sin(\pi/8) \end{bmatrix} \begin{bmatrix} F_{a\text{-}axis} \\ F_{b\text{-}axis} \end{bmatrix}$$

Forces along the thrust axis of the machine may also be determined by taking the partial derivative of the magnetic energy in the direction of the thrust axis of the motor (z-axis):

$$[F_{z\text{-}axis}] = \begin{bmatrix} \dfrac{\partial W_m}{\partial(z\text{-}axis)} \end{bmatrix}$$

If the magnetic field density is sufficiently high and the rotor length less than the length of the stator, then a thrust axis force can be generated to keep the rotor contained within the machine housing without requiring a z axis position detector. This force is a direct result of the increased reluctance seen by the rotor magnetic circuit as the rotor assembly moves axially out from the stator.

Motor action is accomplished in the standard way for a 4-pole permanent magnet machine. In this case, the two coil groups per phase are controlled as if they were electrically series connected.

Figure 3:
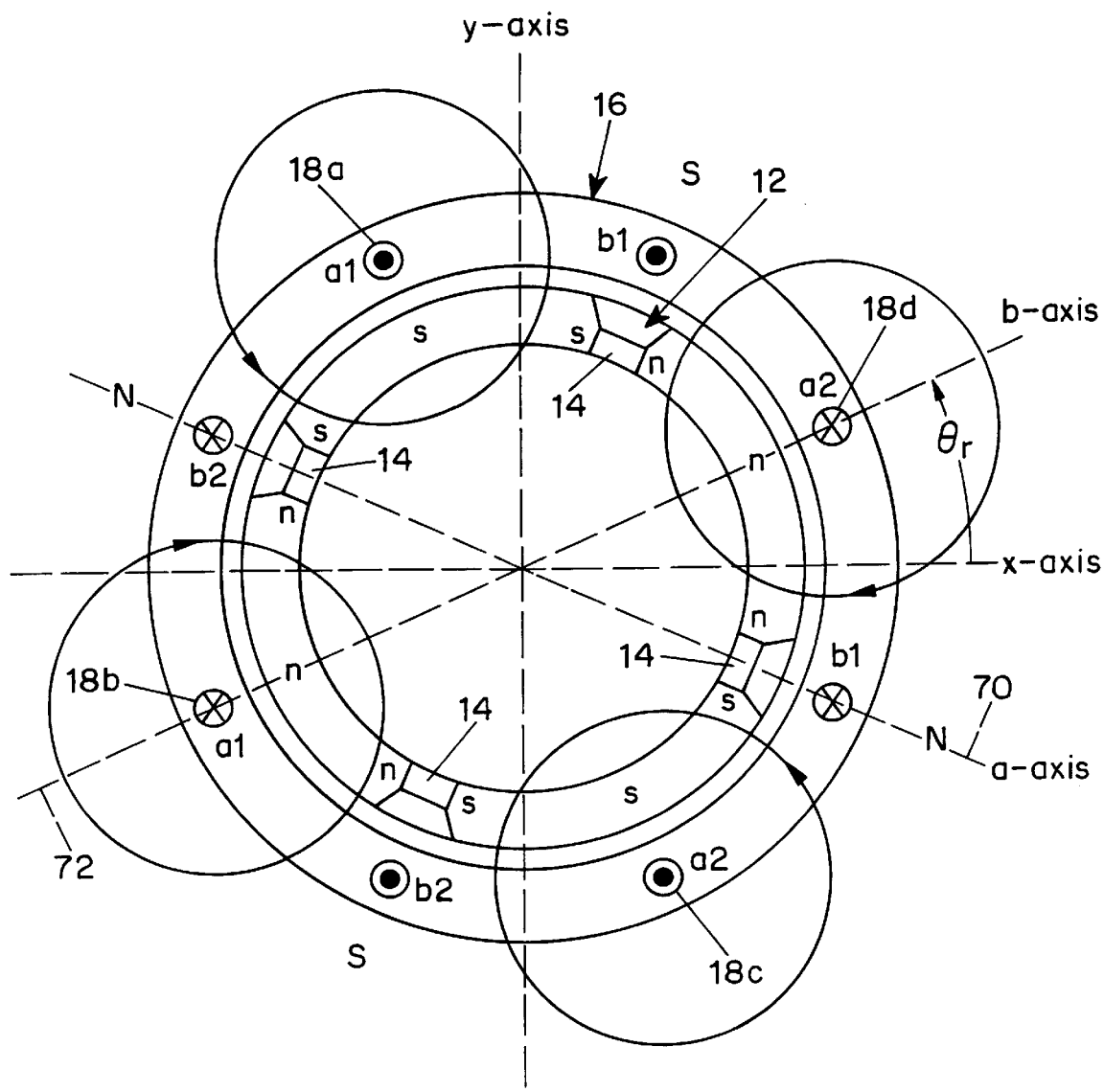
FIG. 3 is a schematic diagram representing a cross-sectional view through a representative embodiment of a permanent magnet synchronous machine with integrated magnetic bearings illustrating the motor action of the arrangement.

FIG. 3 illustrates the principles of motor action of the signals applied to the stator coils 18. In this case, the motor control signals ia*, ib*, ic* are applied to the coils 18a, 18b, 18c and 18d in such a way as to produce current patterns which generate north poles in both directions along the a-axis 70 when the rotor 12 is in the position shown in FIG. 3 with magnets 14 having north and south poles disposed on opposite sides of the a-axis 70. In this condition, the magnetic force of the north poles produced by the coils repels the north poles and attracts the south poles of the magnets, thereby driving the rotor in a counter-clockwise direction as viewed in FIG. 3.

In other words, motor action is accomplished in the standard way for a 4-pole permanent magnet machine. In this case the two coil groups per phase are controlled as if they were electrically series connected.

With the a1 and a2 windings energized in the manner shown in FIG. 3, four poles are created that lead the permanent magnet poles in the direction of rotor motion. If $i_{a1}$ and $i_{a2}$ are sinusoidal and phase shifted from $i_{b1}$ and $i_{b2}$, then a force in the tangential direction (torque) will be produced. A torque is also produced with the b1 and b2 windings similarly energized.

The flux linkage equations in two-phase coordinates for the machine may be expressed as $$\lambda_{ab} = Li_{ab} + \lambda_t$$

where $$\lambda_t = \lambda_t \begin{bmatrix} \cos(\theta_r - \pi/8) \\ \cos(\theta_r - \pi/8) \\ \cos(\theta_r - \pi/8) \\ \cos(\theta_r - \pi/8) \end{bmatrix}$$

The magnetic energy stored in the windings has the same form as given above with respect to the magnetic bearing action. Expanding and simplifying, this results in:

$$W_m = \frac{1}{2}[(i_{a1}^2 L_{a1a1} + i_{a2} i_{a1} L_{a2a1}) + (i_{a1} i_{a2} L_{a1a2} + i_{a2}^2 L_{a2a2}) +$$
$$(i_{b1}^2 L_{b1b1} + i_{b2} i_{b1} L_{b2b1}) + (i_{b1} i_{b2} L_{b1b2} + i_{b2}^2 L_{b2b2})] +$$
$$i_{a1} \lambda_m \cos\left(\theta_r - \frac{\pi}{8}\right) + i_{a2} \lambda_m \cos\left(\theta_r - \frac{\pi}{8}\right) +$$
$$i_{b1} \lambda_m \cos\left(\theta_r + \frac{\pi}{8}\right) + i_{b2} \lambda_m \cos\left(\theta_r + \frac{\pi}{8}\right)$$

The torque produced by the machine can be determined by taking the partial derivative of the magnetic energy in the $\theta_r$ direction.

$$Te = \frac{\partial W_m}{\partial \theta_r} = \lambda_m \left[ -(i_{a1} + i_{a2})\sin\left(\theta_r - \frac{\pi}{8}\right) - (i_{b1} + i_{b2})\sin\left(\theta_r + \frac{\pi}{8}\right) \right]$$

If desired, the z axis sensor 26 may be omitted, leaving the z axis as an open loop in which case the change in reluctance as the rotor moves out of the stator will cause a restoring force without requiring any active control of the windings as described above. This arrangement is possible if there is a small thrust load or if moderate shaft run-out is tolerable. Mover, if desired, a small auxiliary winding may be included to modulate the thrust in the axial direction. This winding can also serve to locate the axial position in the rotor within the stator. As another alternative, the standard mechanical thrust bearing may be used in place of a magnetic thrust bearing.

The permanent magnet synchronous machine of the invention may also be used as an AC generator if the motor is coupled to a rotating drive shaft. Furthermore, the stator may be split into two halves with each half separated from the other along the plane passing through the rotor shaft. This arrangement would permit active control of rotor tilt.

Although the invention has been described herein with reference to specific embodiments, many modifications and variations therein will readily occur to those skilled in the art. Accordingly, all such variations and modifications are included within the intended scope of the invention.

We claim:

1. A permanent magnet synchronous machine comprising:
   a stator including a plurality of stator coils;
   a rotor disposed within the stator having a plurality of permanent magnets disposed around a periphery;
   position detecting means including a detector for detecting displacement of a rotor in each of horizontal, vertical and axial directions within the stator and including means for generating control signals for application to the stator coils to control an axial position of the rotor within the stator; and
   synchronous machine control means for generating rotation control signals and for applying the rotation control signals to the stator coils to control rotation of the rotor within the stator wherein the stator coils provide magnetic bearings for supporting the rotor and wherein the magnetic bearings for the synchronous machine are solely provided by the stator coils.

2. A permanent magnet synchronous machine according to claim 1 wherein the synchronous machine control means includes:

an angle detector for detecting an angular position of the rotor within the stator;

a speed detector for detecting a rotational speed of the rotor; and comparing means for comparing the angular position and the speed of the rotor with a signal representing a desired angular position and speed of the rotor and providing corresponding motor control signals to the stator coils.

3. A permanent magnet synchronous machine according to claim 2 wherein the synchronous machine control means includes converter means for converting control signals from a stationary reference frame to a synchronous reference frame.

4. A permanent magnet synchronous machine according to claim 2 wherein the synchronous machine control means includes converter means for converting two-phase synchronous signals to three-phase signals for application to the stator coils.

5. A permanent magnet synchronous machine according to claim 1 wherein the position detecting means includes:

comparing means for comparing signals corresponding to the rotor positions in the horizontal and vertical planes with desired positions and including means for providing corresponding magnetic bearing control signals.

* * * * *